United States Patent [19]

Marko et al.

[11] Patent Number: 5,732,350

[45] Date of Patent: Mar. 24, 1998

[54] METHOD FOR MOBILE STATION LOCATION REGISTRATION WITH DYNAMIC CELL GROUPING FOR RADIOTELEPHONE SYSTEMS

[75] Inventors: Paul D. Marko, Pembroke Pines, Fla.; Kenneth D. Alton, Austin, Tex.

[73] Assignee: Motorola, Inc., Schaumburg, Ill.

[21] Appl. No.: 568,094

[22] Filed: Dec. 6, 1995

[51] Int. Cl.$^6$ ...................................... H04B 7/00
[52] U.S. Cl. .................. 455/435; 455/432; 455/433
[58] Field of Search ........................ 455/33.1, 33.2, 455/33.4, 134, 435–439, 432–433, 442–444; H04B 7/00

[56] References Cited

U.S. PATENT DOCUMENTS

| | | |
|---|---|---|
| 4,737,978 | 4/1988 | Burke et al. .................. 379/60 |
| 4,775,999 | 10/1988 | Williams ...................... 379/59 |
| 5,095,531 | 3/1992 | Ito ................................. 455/33 |
| 5,203,010 | 4/1993 | Felix et al. ................. 455/33.2 |
| 5,212,822 | 5/1993 | Fukumine et al. .......... 455/33.1 |
| 5,222,248 | 6/1993 | McDonald et al. ......... 455/33.2 |
| 5,276,906 | 1/1994 | Felix ............................ 455/33.2 |
| 5,276,907 | 1/1994 | Meidan ....................... 455/33.3 |
| 5,289,527 | 2/1994 | Tiedemann, Jr. ............ 379/59 |
| 5,305,466 | 4/1994 | Taketsugu ................... 455/33.1 |
| 5,361,396 | 11/1994 | Onoe et al. ................. 455/33.4 |
| 5,379,451 | 1/1995 | Nakagoshi et al. ........ 455/435 |
| 5,442,682 | 8/1995 | Svedin et al. .............. 379/59 |
| 5,621,784 | 4/1997 | Tiedemann, Jr. et al. .. 455/33.1 |
| 5,642,398 | 6/1997 | Tiedemann, Jr. et al. .. 455/33.1 |

OTHER PUBLICATIONS

Okasaka et al., "A New Location Updating Method for Digital Cellular Systems", *Proceedings of the 41st IEEE Vehicular Technology Conference*, May 19–22, 1991, pp. 345–350.

*Primary Examiner*—Tommy P. Chin
*Assistant Examiner*—Vu Le
*Attorney, Agent, or Firm*—John G. Rauch

[57] ABSTRACT

A method for registering a mobile station (307) in a radiotelephone communication system (300). The mobile station (307) receives system information from a base station (321), including a cell grouping level. The mobile station (307) determines if it is registered with the base station (321). If not, the mobile station (307) registers. The network controller of the radiotelephone communication system (300) automatically registers the mobile stations with all base stations defined by the cell grouping level. The mobile station (307), using the same algorithm, maintains a record of the base stations with which it is automatically registered.

12 Claims, 5 Drawing Sheets

○ = POSITION OF LOCATION REGISTRATION 5,732,350

METHOD FOR MOBILE STATION LOCATION REGISTRATION WITH DYNAMIC CELL GROUPING FOR RADIOTELEPHONE SYSTEMS

FIELD OF THE INVENTION

The present invention generally relates to radiotelephone systems. The present invention more particularly relates to location registration of a mobile station in a cordless or cellular radiotelephone system.

BACKGROUND OF THE INVENTION

Radiotelephone systems generally include a plurality of base stations configured to communicate with one or more mobile stations. Each base station provides transmission and reception of radiotelephone signals in a respective service area. Mobile stations in a given service area communicate with the base station associated with that area. The base station provides communication between the mobile stations and the public switched telephone network. The radiotelephone system is controlled by a network controller.

Mobile stations may move among service areas. The mobile stations may be mounted in automobiles or hand-carried by the user. The mobile station monitors aspects of the communication channel between the mobile station and surrounding base stations, such as received signal strength (RSS). As mobile stations are moved from a first service area to a second service area, the mobile stations establish communication with the base station servicing the second service area and discontinue communication with the base station serving the first service area. This process is known as hand-off and is generally automatically accomplished.

In order that calls may be efficiently routed to a particular mobile station, each mobile station generally registers its location with the nearest base station. An incoming call is then routed by the network controller to that base station which then establishes radio communication with the mobile station to complete the call. If the mobile station is not registered, the radiotelephone system will send a broadcast message generally known as a page to alert the mobile station to register its location. When a mobile station moves into a new service area, it will automatically register with the base station associated with the new service area. The registration process occurs independently of hand-off.

The number of radio channels available for call traffic, paging, registration and other purposes is limited for each base station. In densely populated areas at times of heavy system usage, there may be times when no radio channels are available. One solution to provide additional channels is to provide more base stations serving smaller service areas. In extreme situations, such as in urban areas which may have many, densely located mobile stations, service areas may be as small as one city block or a single floor of a high rise building to provide a sufficient number of channels to carry communication and control channel traffic. Such service areas are referred to as microcells.

A limitation to the microcell strategy for providing additional communication and control channels is the channel traffic required for registration of the many mobile stations moving among service areas. As the number of base stations and cells in a system increases, the number of user registrations must also increase. Each mobile station carried down the street must register with the base station serving each newly-entered service area.

Another source of additional registration traffic is signal shadowing. Shadowing occurs when a signal is partially blocked by an object in the path between the mobile station and the base station. Shadowing may cause extreme, rapid variation in received signal quality, including received signal strength. For example, when a mobile station is located near a boundary between cells, the mobile station's determination of the appropriate base station for registration may change frequently in a short period of time due to signal shadowing. The mobile station attempts to register with the base station which provides the greatest received signal strength. RSS levels may change as the user turns his head, shadowing the mobile station's antenna from the received signals. In such a case, the mobile station may repeatedly register and re-register with two or more adjacent base stations, increasing registration traffic.

One solution proposed for location registration in microcell systems handling large numbers of subscribers involves a multi-layer location updating method. The coverage area of the system using this method has multiple location registration area layers. There are a fixed number of layers which are staggered and overlay each other. Mobile stations are divided into groups and each group is assigned to one or more layers. Mobile stations of each group have several location registration area layers. When a mobile station updates its registration, the mobile station switches layers or it updates to a different layer.

This proposal is very complicated and inefficient to implement, however. In a system using a hexagonal cell structure, where cells are grouped in groups of 19 cells, 19 layers are required to implement this scheme. The large number of layers requires substantial coordination and system overhead to operate smoothly. There is substantial broadcast overhead required, as each base station in each cell must transmit layer information so mobile stations can determine when to re-register. Dividing location registration areas into more layers requires more broadcast information, as the same information must be sent per layer, per cell.

Accordingly, there is a need for an improved method for registering a mobile station in a radiotelephone system which reduces registration traffic on radio channels, particularly in microcellular applications.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENTS

Figure 1:
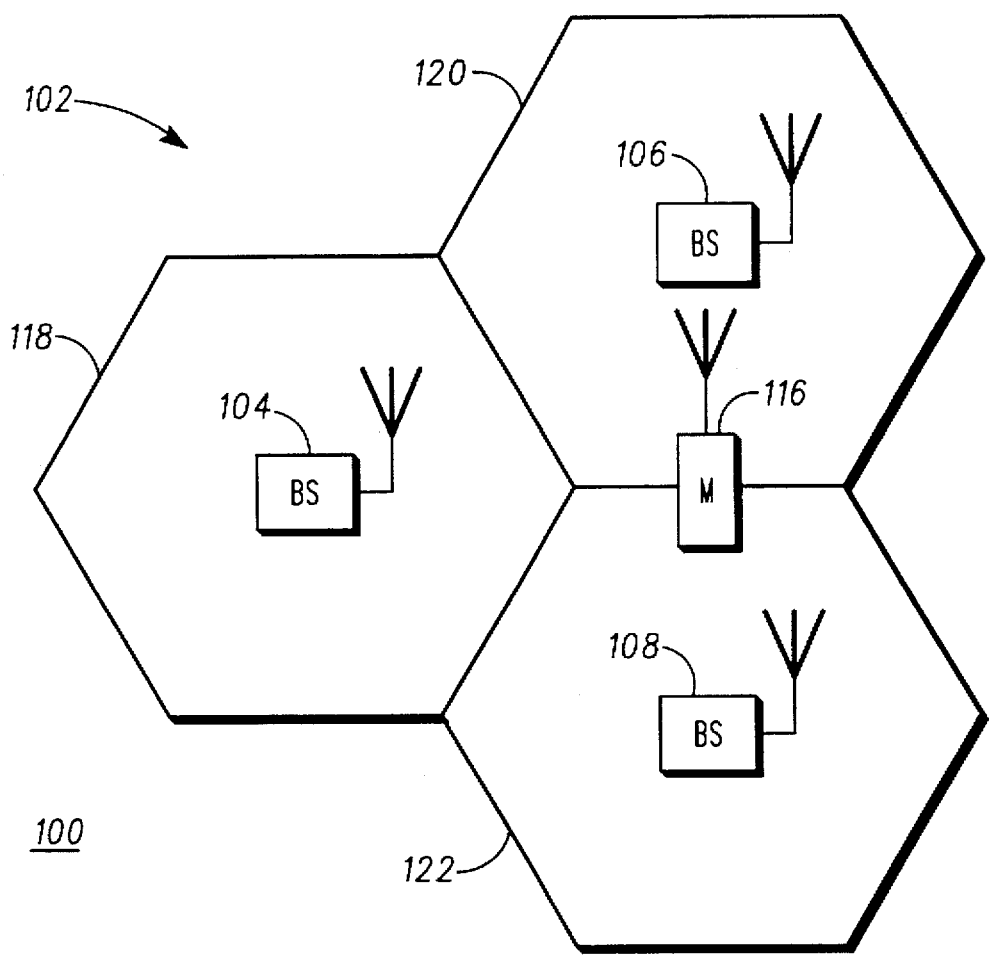
FIG. 1 generally depicts an idealized geographic layout of radiotelephone system with which the present invention may be used.
Figure 1:
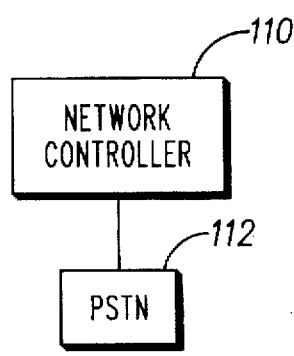

FIG. 1 generally depicts an idealized geographic layout of a radiotelephone system 100 with which the present invention may be used. The radiotelephone system 100 generally includes a plurality 102 of base stations, including base station 104, base station 106, and base station 108, and network controller 110. The network controller 110 is coupled to the public switched telephone network 112. The network controller 110 further is in wireline communication with each base station of the plurality 102 of base stations. The individual connections between the network controller 110 and the plurality 102 of base stations are not illustrated in FIG. 1 so as not to unduly complicate the figure.

Each of the plurality 102 of base stations is configured to be in radio communication with one or more mobile stations such as mobile station 116. Such radio communication is conducted according to a standardized protocol, as is well known in the art. The terms "mobile station" or "mobile" as used herein, refer to mobile radiotelephones such as may be mounted in a car or other vehicle or portable radiotelephone handsets which are self-contained and may be carried by the user. Through radio communication with one or more of the base stations 104, 106, 108, the mobile station 116 may complete a call with another mobile station (not shown) in the system 100 or with another subscriber coupled to the public switched telephone network 112.

To provide effective radiotelephone communication, each base station of the plurality 102 of base stations serves a respective service area. Thus, base station 104 serves service area 118, base station 106 serves service area 120, and base station 108 serves service area 122. In FIG. 1, the service areas are illustrated as being hexagonal in shape. However, it will be recognized by those ordinarily skilled in the art that the service areas 118, 120, 122 may have any shape, such as triangular, square, or otherwise. Moreover, it will also be recognized by those ordinarily skilled in the art that the system 100 may include any number of base stations and any number of mobile stations such as mobile station 116 may be operated in conjunction with the system 100.

Figure 2:
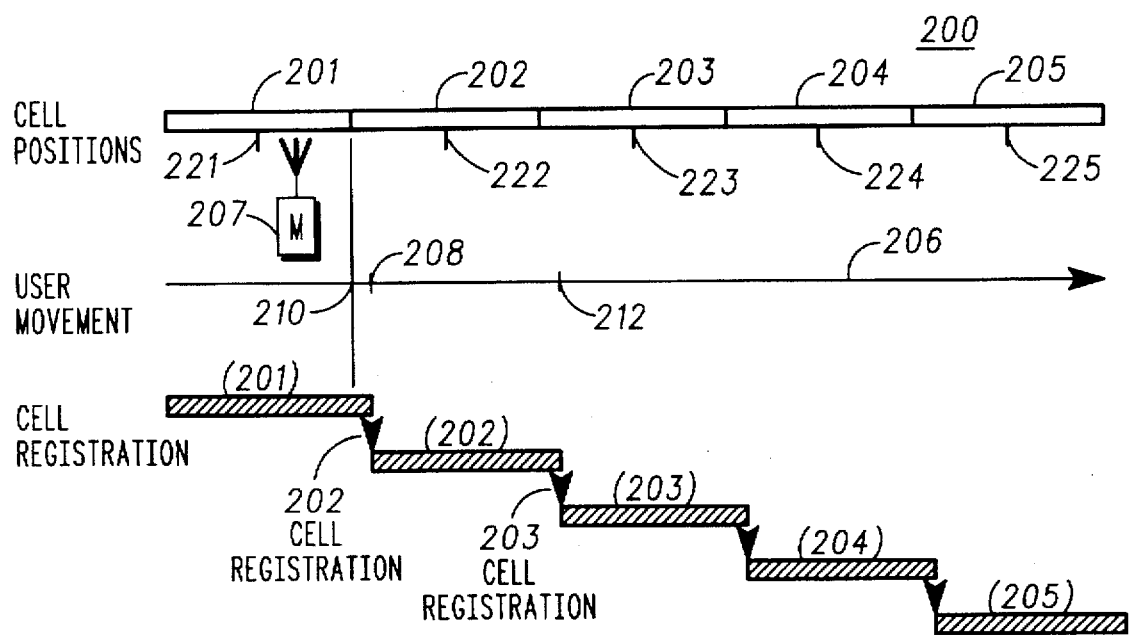
FIG. 2 illustrates cell registration as a function of user position in a prior art radiotelephone system.

Referring now to FIG. 2, it illustrates cell registration as a function of user positioning in a prior art radiotelephone system 200. For simplicity, FIG. 2 illustrates user movement along a single axis 206. FIG. 2 thus models cell registration in the case of a user carrying a mobile station along a generally straight path through a series of service areas, such as along a street, highway or other road, while traveling on a train, or while riding an elevator in a high rise building.

The prior art radiotelephone system 200 includes cells 201, 202, 203, 204, 205, as illustrated in FIG. 2. The cells 201, 202, 203, 204, 205 are linearly arranged along the axis 206. Each of the cells 201, 202, 203, 204, 205 includes a base station for establishing radio communication with one or more mobile stations located within each respective cell 201, 202, 203, 204, 205. Cell 201 includes base station 221. Cell 202 includes base station 222. Cell 203 includes base station 223. Cell 204 includes base station 224. Cell 205 includes base station 225.

FIG. 2 further indicates the location at which cell registration occurs as a user carrying a mobile station 207 travels along the axis 206. This is indicated in the lower half of FIG. 2, with the number in parentheses indicating the cell with which the mobile station 207 is registered as the mobile station 207 moves along the axis 206. Thus, beginning at the left hand side of FIG. 2, the mobile station registers with cell 201. That is, the mobile station 207 registers with base station 221 which serves the service area defined by cell 201. As the mobile station moves along the axis 206, the mobile station 207 monitors the quality of signals received from base stations including base station 221 located in cell 201 and base station 222 located in cell 202. When the signal quality, such as the received signal strength (RSS), of the signal received from base station 222 exceeds the quality of the signal received from base station 221, at a point designated point 208 on the axis 206, the handset registers with base station 222 in cell 202 and discontinues its registration with base station 221 in cell 201.

Depending on the quality of the various received signals and on the hysteresis of the signal strength averaging algorithm used by the mobile station 207, the point at which registration with cell 202 occurs, point 208, may be reached after the handset crosses the point 210 defining the geographical boundary between cell 201 and cell 202. The mobile station 207 continues moving along the axis 206 and continues monitoring received signal quality. When the mobile station reaches point 212, the mobile station registers with base station 223 in cell 203.

Thus, as the user carrying the mobile station 207 enters the service area of the radiotelephone system 200, the mobile station 207 first registers with cell 201 allowing the network controller (not shown) for the system 200 to route calls for that mobile station 207 to cell 201. When the mobile station 207 passes through to cell 202, a second registration automatically occurs to update the network controller with the new service area entered. The mobile station 207 initiates the registration process based on signal strength and quality received from the respective cells. To avoid multiple registrations between cells due to signal fluctuations at the midpoint, point 210, the mobile station 207 executes an averaging algorithm with hysteresis. This typically delays the registration to the adjacent cell until the mobile station 207 is well within that cell, point 208. Even with averaging algorithms, multiple registrations at the midpoint between cells still occur due to body shadowing and other small sector shadowing effects. These multiple registrations increase network traffic, reduce available capacity, and reduce battery life of the mobile station 207.

Figure 3:
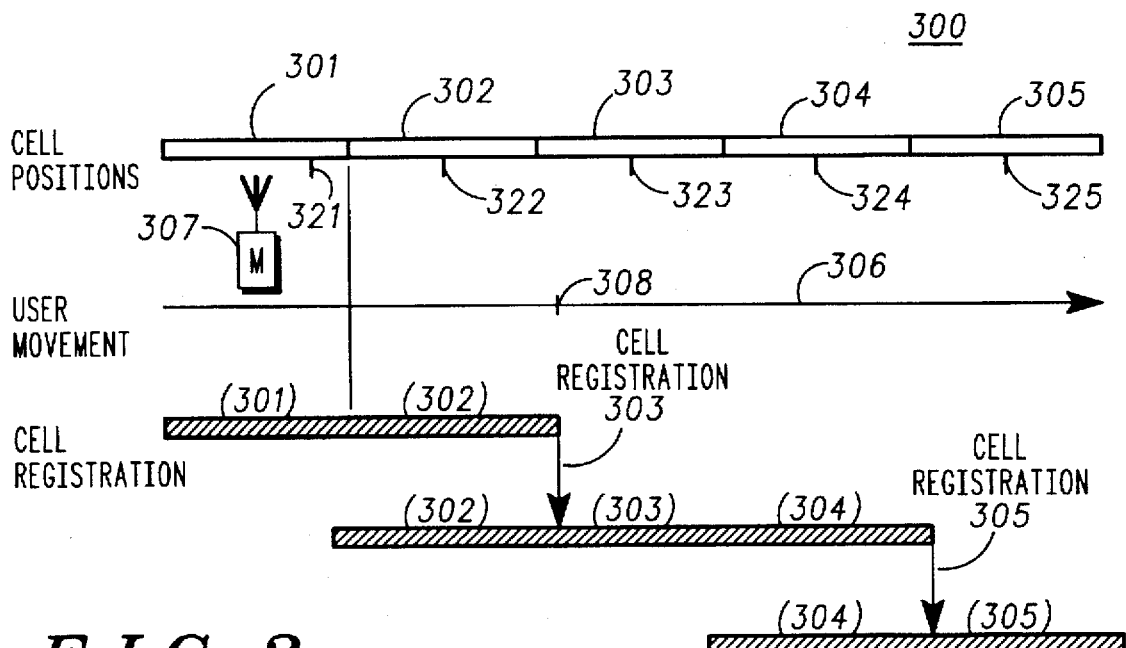
FIG. 3 illustrates cell registration as a function of user position in a radiotelephone system according to the present invention.

Referring now to FIG. 3, it illustrates cell registration as a function of user position in a radiotelephone communication system 300 according to the present invention. The system 300 is divided into a plurality of cells or service areas 301, 302, 303, 304, 305. As was the case in FIG. 2, FIG. 3 shows a one-dimensional system 300 in which a user carrying a mobile station 307 moves along a single axis 306. FIG. 3 thus models cell registration in the case of a user carrying a mobile station along a generally straight path, such as a road, rail line or in an elevator.

The system 300 includes a plurality of base stations, each base station serving a respective service area 301, 302, 303, 304, 305 of a plurality of service areas. Service area 301 includes base station 321. Service area 302 includes base station 322. Service area 303 includes base station 323. Service area 304 includes base station 324. Service area 305 includes base station 325. The base station serving each respective service area 301, 302, 303, 304, 305 establishes radio communication with mobile stations such as mobile station 307 located within the respective service area 301, 302, 303, 304, 305. Further, the base station transmits system information on control channels for receipt by mobile stations such as mobile station 307. The base station and the mobile station communicate using control channels and communication channels in accordance with a predetermined communications protocol.

FIG. 3 further indicates the location at which cell registration occurs as a user carrying a mobile station travels along axis 306. In FIG. 3, a cell grouping level of 1 is assumed. This is indicated in the lower half of FIG. 3, with the number in parentheses indicating the cell or service area with which the mobile station 307 is registered as the mobile station moves along the axis 306. Thus, beginning at the left hand side of FIG. 3, the mobile station 307 registers with cell 301. That is, the mobile station 307 registers with the base station 321 which serves the service area defined by cell 301. In addition, in accordance with the present invention, the mobile station 307 is also registered with all cells within the group of cells defined by the cell grouping level of 1. Thus, the mobile station is also registered with cell 302, as is indicated in FIG. 3.

As the mobile station 307 moves along the axis 306, the mobile station 307 monitors the quality of signals received from base stations including base station 321 located in cell 301, base station 322 located in cell 302 and base station 323 located in cell 303. When the signal quality, such as the received signal strength (RSS), of the signal received from base station 323 exceeds the quality of the signal received from base station 321 and base station 322, the mobile station 307 registers with base station 323 in cell 303 at point 308. Depending on the quality of the various received signals and on the hysteresis of the signal strength averaging algorithm used by the mobile station 307, the point 308 at which registration with cell 202 occurs may be reached after the mobile station 307 crosses the point defining the geographical boundary between cell 302 and cell 303.

When the mobile station 307 registers with base station 323, in accordance with the present invention the mobile station is also registered with all base stations within the group of cells defined by the cell grouping level of 1. That is, the mobile station is also registered with base station 324 in cell 304 and base station 322 in cell 302. At this point, the mobile station is free to move about in any of cells 302, 303, or 304 without the need to re-register. Further, movement of the mobile station 307 within, for example, cell 303 near the boundary of cell 303 and cell 302 or the boundary of cell 303 and cell 304 is not accompanied by repeated registering and re-registering with the two adjacent base stations. Thus, registration traffic in the radiotelephone system 300 is reduced.

The mobile station 307 continues moving along the axis 306 and continues monitoring received signal quality. When the signal quality from base station 325 in cell 305 exceeds the signal quality from base station 324 in cell 304, the mobile station 307 registers with base station 325 in cell 305. In accordance with the present invention and with a cell grouping level of 1, the mobile station 307 also registers or retains its registration with base station 324 in cell 304.

FIG. 3 depicts Level 1 cell grouping, which refers to the threshold value and the number of cells adjacent to the registration cells which are included in the registration area. In Level 1 cell grouping, the mobile station 307 registers with all cells contiguous with the registration cell. However, the level of cell grouping provided by the algorithm may be varied. For example, Level 2 or Level 3 cell grouping are also available. Preferably, this level is programmable on a cell-by-cell basis and is downloaded to the mobile station 307 during the registration process. This allows the cell grouping to be dynamically adjusted with changing traffic and capacity demands on the system 300.

Figure 4:
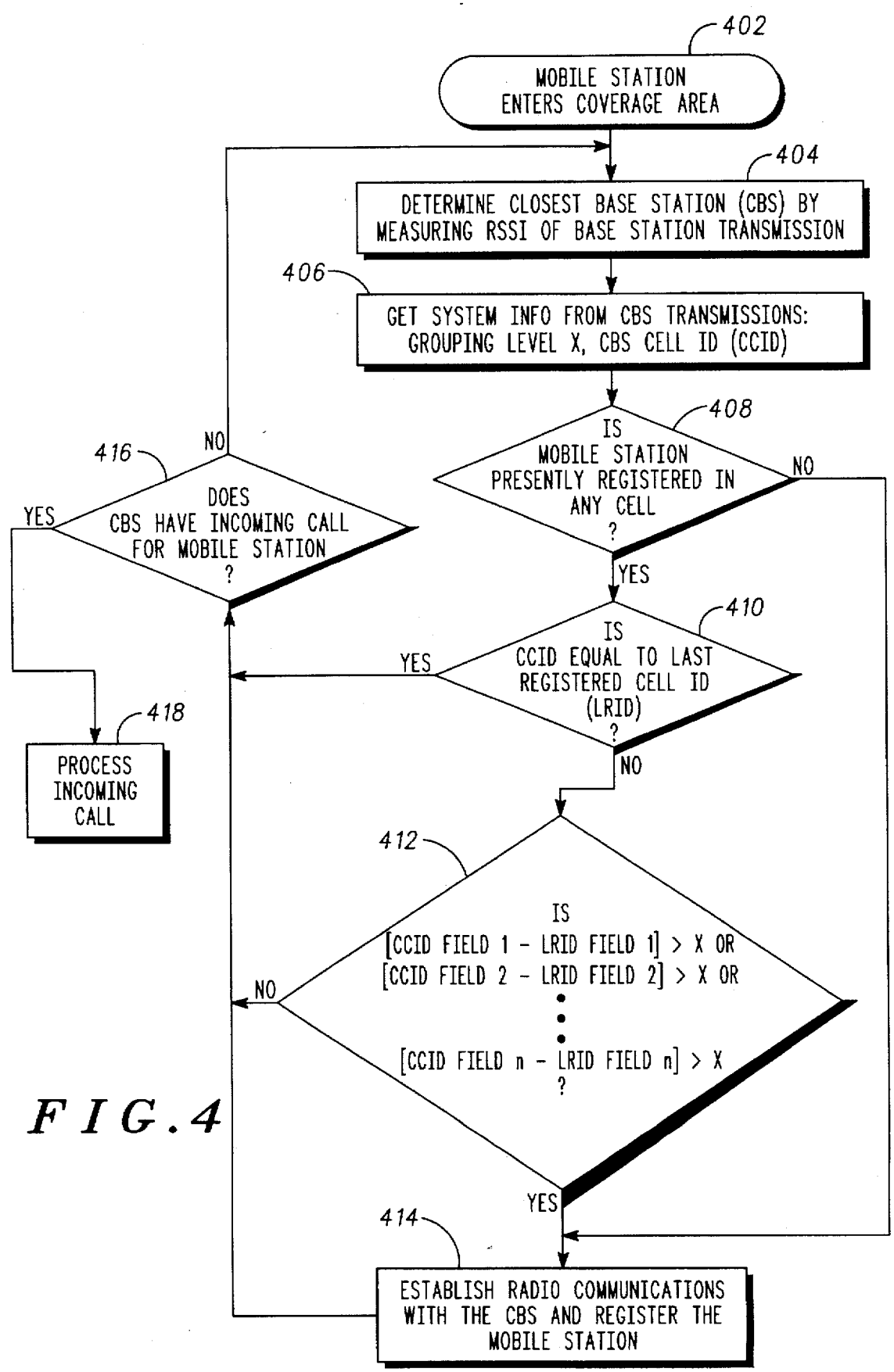
FIG. 4 is a flow diagram illustrating the method according to the present invention.

FIG. 4 is a flow diagram illustrating a method for registering a mobile station in a radiotelephone system according to the present invention. The method begins at step 402 where a mobile station such as mobile station 307 (FIG. 3) enters the coverage area of a radiotelephone system such as radiotelephone system 300 (FIG. 3). At step 404, the mobile station receives a first signal from a first base station serving a first service area. In addition, the mobile station may also receive a second signal from a second base station or other signals as well. Preferably, the first signal and the second signal comprise control channel signals broadcast by the first and second base station. The control channel signals include system information such as a base station identifier which uniquely identifies the first base station and the second base station in the radiotelephone system. In accordance with the present invention, the system information also includes a cell grouping level, the cell grouping level defining a group of one or more service areas including the first service area. As will be described further below, the cell grouping level defines the number of ranks of service areas, or cells, surrounding the first service area with which the mobile station will be automatically registered by the radiotelephone system.

Also at step 404, the mobile station detects a received signal characteristic of the first signal, the second signal and any other received signals. Preferably, the signal characteristic is related to the quality of the received signal, such as a received signal strength indication (RSSI). Circuits for detecting received signal strength indication are well known in the art. In response to the received signal characteristic, the mobile station selects as the first base station the base station from which the mobile station receives the signal having the best signal quality. For example, the mobile station determines which base station has the greatest received signal strength, corresponding to the closest base station.

At step 406, the mobile station receives the first signal broadcast by the first base station. The mobile station determines system information from the first signal. The system information preferably includes a cell grouping level and a first cell identifier or base station identifier which uniquely identifies the base station.

Preferably, service areas in the radiotelephone system are arranged along one or more axes. In a multi-dimensional system, the service areas are arranged along multiple axes. In accordance with the present invention, the base station identifier (or cell identifier) uniquely locates the base stations (and associated service areas) on each axis of the one or more axes. The base station identifier preferably contains one or more fields corresponding to one axis of the one or more axes. Using the base station identifiers, the cells or service areas may be considered to be in ranks of service areas surrounding a particular service area.

Continuing with the description of the method, at step 408, the mobile station determines if the mobile station is presently registered in any cell of the radiotelephone system. Preferably, the mobile station includes a memory for storing an indication of previous cell registration, including a last registered cell identifier which indicates the base station identifier of the last cell, if any, with which the mobile station registered. If the mobile station has just entered the coverage area of the system or has just been powered up, the mobile station has not yet registered and execution continues at step 414. If the mobile station has previously registered, the registration information including the last registered cell identifier is read by the mobile station and execution continues at step 410.

At step 410, the mobile station determines if the base station identifier of the first (closest) base station matches the last registered cell identifier. If the two identifiers match, the mobile station has previously registered with the closest base station and execution continues with step 416. If the two identifiers do not match, the mobile station must determine if registration with the closest base station is required and the method continues at step 412.

At step 412, the mobile station determines whether the closest base station determined in step 404 is included in the group of one or more service areas defined by the cell grouping level surrounding the last registered service area. Preferably, the mobile station relates the base station identifier for the closest base station and the last registered cell identifier in a manner to the described below.

The mobile station compares the base station identifier for the closest base station with the last registered base station identifier. If the absolute value of the difference between any one of the respective axes fields of the base station identifier for the closest base station and the last registered base station is greater than the cell grouping level, the mobile station will register with the closest base station. This calculation represents the basic algorithm for determining if a mobile station is within or outside the present registration cell group.

The method continues at step 414 where the mobile station is registered. To register, the mobile station establishes radio communication with the closest base station according to the radio communication protocol of the radiotelephone system. The mobile station then transmits a registration request to the closest base station and the base station registers the mobile station with the base station and conveys registration information to the network controller.

Under control of the network controller, the mobile station is registered with the first base station and with all base stations within the group defined by the cell grouping level. Thus, with a cell grouping level of 1, the mobile station is registered in a rank of service areas including the service area associated with the first base station and all immediately adjacent service areas. If the cell grouping level had been 2, the mobile station would additionally be registered with all service areas immediately adjacent to the grouping level 1 group of cells. This technique using a cell grouping level of 1 creates a one cell buffer around the cell (service area) served by the current, closest base station. This eliminates multiple registrations due to signal fluctuations or shadowing between cells. This technique also reduces cell registrations in the system because, once a mobile station is registered with a service area, a mobile station is also registered with adjacent service areas.

Registering with the adjacent cells is preferably provided by the network controller (not shown) for the system to further eliminate registration traffic. The network controller determines what service areas to register a mobile station in using the same algorithm as the mobile station. The network controller for the system routes calls to the mobile station based on knowledge of the mobile station's dynamic registration algorithm.

Figure 5:
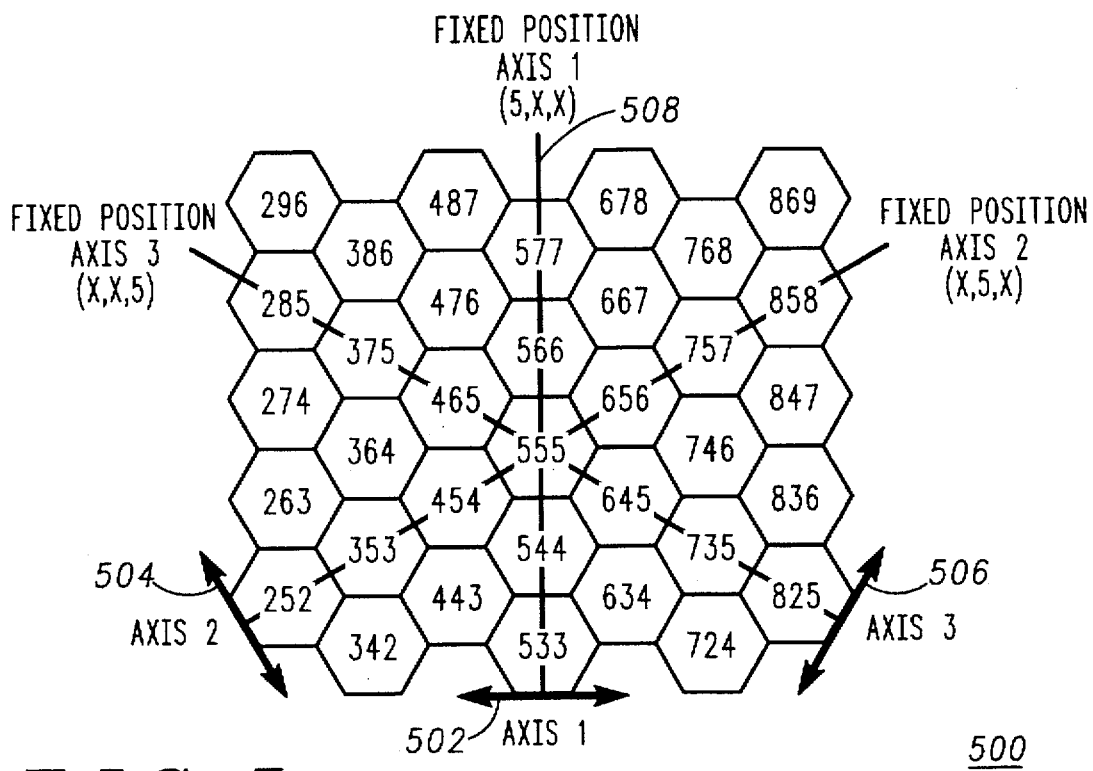
FIG. 5 depicts a cell identification system for a hexagonal cell pattern with which the present invention may be used.

Referring now to FIG. 5, a cell identification system for a two-dimensional, hexagonal cell pattern for use with the present invention is depicted. FIG. 5 illustrates assignment of location parameters, also referred to as cell identifiers, to cells in a hexagonal cell pattern 500. Each of the cells is arranged along three axes, including a first axis 502, a second axis 504, and a third axis 506. Each of the cells has a unique 3-field location parameter. Each field is associated with one axis and the number within the field specifies the cell position on the axis. Adjacent cells with the same axis field number have a fixed position along the respective axis and form a line perpendicular to the axis, as shown by line 508 and axis 502. A similar location parameter assignment using multiple axes can be made for a cell pattern using cells of different shapes, such as triangular cells or square cells. Also, this same location parameter assignment technique can be extended to a three-dimensional cell pattern by using a fourth axis extending from the page containing FIG. 5. Such a cell pattern might exist in a microcellular radiotelephone system installed in a multi-story office building.

Figure 6:
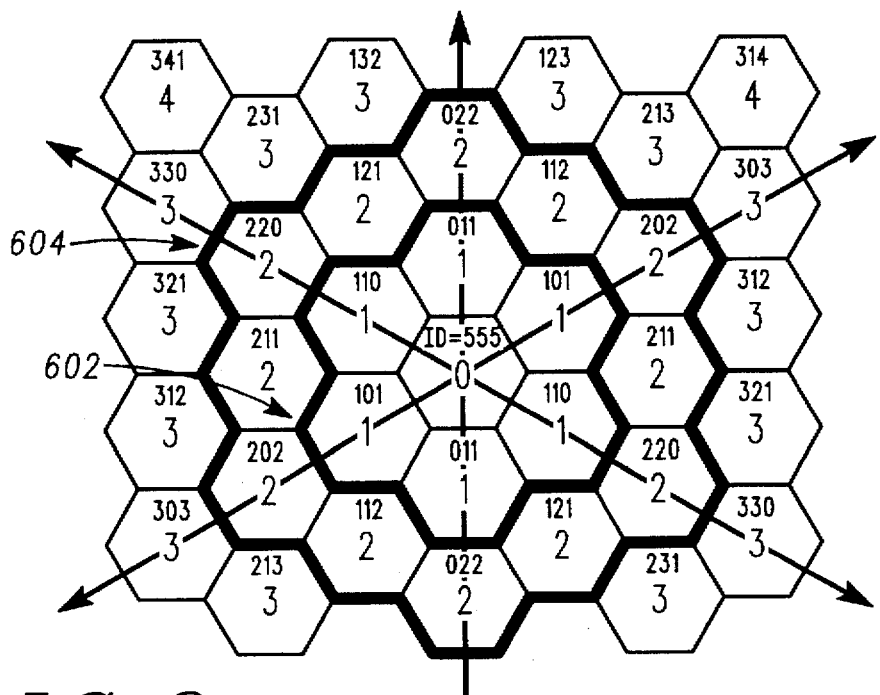
FIG. 6 depicts levels of cell grouping for a hexagonal cell pattern for use with the present invention.

FIG. 6 depicts different levels of cell grouping for the hexagonal cell pattern and identifiers 500 for use with the present invention. The large single digit in each cell represents the largest axis offset from the cell having the identifier 555 and the three smaller numbers represents the individual axis offsets. According to the overall group level calculation in the algorithm described above, a mobile unit registered to cell 555 will only register to a new cell if the magnitude of one of the new cell's axis fields exceeds the specified group level. Thus in FIG. 6, if the mobile unit moves to a cell in which the large digit exceeds the group level, registration will take place. For Level 1 cell grouping, when a mobile station registers with the base station serving the service area associated with the cell identified as 555 in the center of FIG. 6, the mobile station is also automatically registered with all cells in group 602 by the network controller (not shown). Incoming call notification for the mobile station will then be routed to all cells in group 602. This is accomplished in the network by simply routing call notification to all cells with axis offsets from the last mobile station cell registration which do not exceed the group level. For Level 2 cell grouping, when the mobile station registers with the cell identified as 555, the mobile station is also automatically registered with all cells within group 604.

In FIG. 6, it can be seen that each service area is surrounded by ranks of service areas and that the cell grouping level indicates a number of the ranks of service areas surrounding a given service area. For example, group 602 corresponds to a rank of service areas identifiable in that, as illustrated in FIG. 6, the service areas all are indicated by a large number 1. A second rank of service areas includes the service areas indicated in FIG. 6 by a large number 2.

Figure 7:
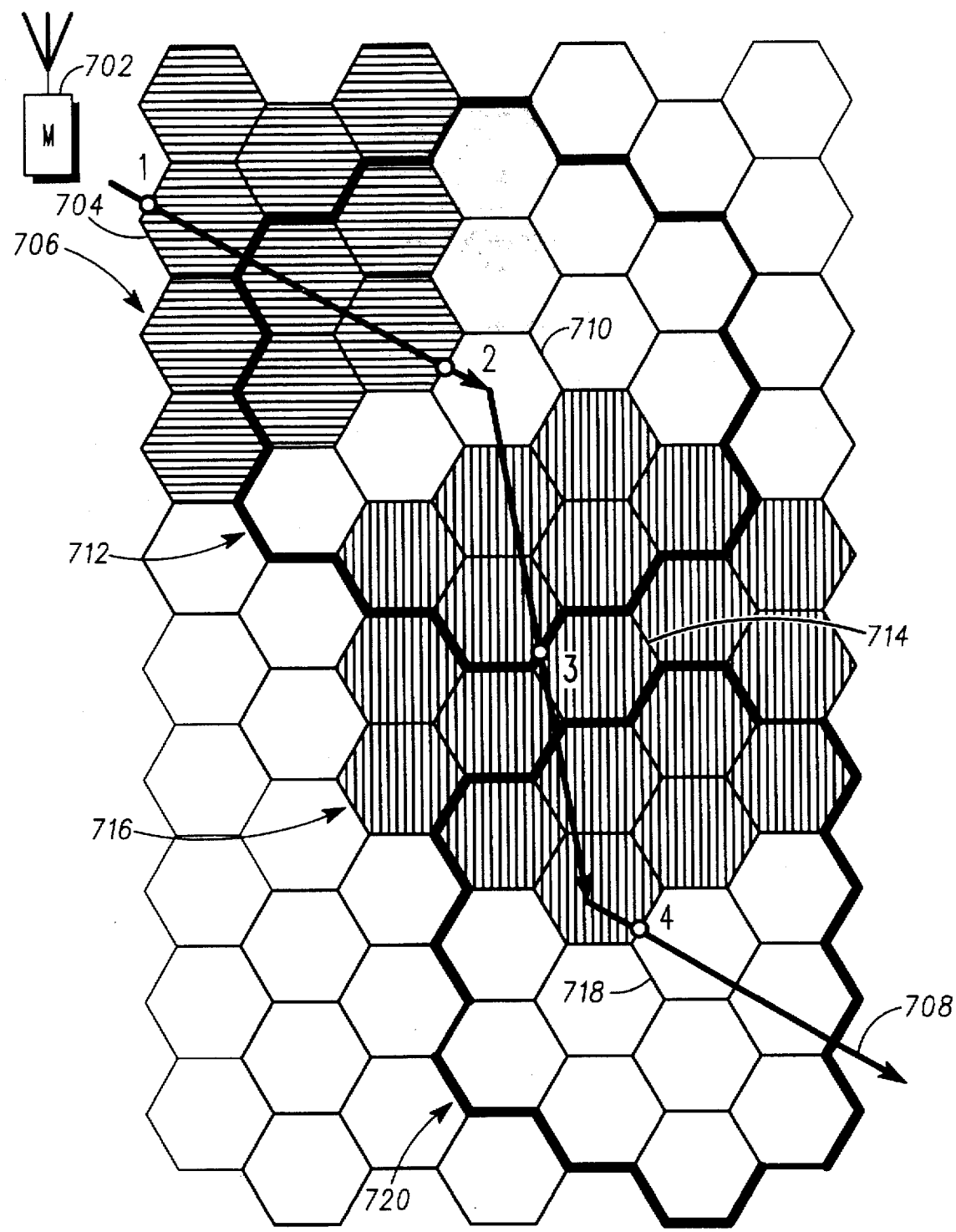
FIG. 7 depicts location registration by a mobile station in the radiotelephone system of FIG. 1 according to the present invention.

FIG. 7 depicts Level 2 location registration by a mobile station 702 in a radiotelephone system 700 according to the present invention. In the two-dimensional system 700 illustrated in FIG. 7, the mobile station 702 is free to move along either of three cell axes contained in the plane of the page. FIG. 7 illustrates Level 2 grouping.

As the mobile station 702 enters the service area of the system 700, the mobile station 702 registers with cell 704 at point 1 illustrated in FIG. 7. That is, the mobile station 702 registers with the base station (not shown) which serves cell 704. In addition, the mobile station 702 is automatically registered with all the cells contained in group 706 for Level 2 registration. These cells are illustrated with a horizontal cross-hatch in FIG. 7 for the purpose of clarify. Thus, the mobile station 702 has a two cell buffer around the cell where it is currently registered.

As the mobile station 702 moves along the path 708, the mobile station 702 comes to cell 710 where the mobile station 702 is not yet registered, as indicated by the outcome of the level 2 algorithm calculation. The mobile station thus registers with cell 710 at point 2 in FIG. 6. In addition to registering with cell 710, the mobile station 702 is also automatically registered with all cells in group 712, again creating a two cell boundary around the registration cell 710. The mobile station 702 may move anywhere within this two cell buffer region defined by group 712 without having to re-register.

As the mobile station 702 moves along the path 708 to point 3 in FIG. 6, the mobile station comes to cell 714, with which the mobile station 702 is not registered. Therefore, at point 3, the mobile station 702 registers with cell 714, and with all cells located in group 716. The cells in group 716 are identified by vertical cross-hatching. Moving farther along the path 708, when the mobile station 702 reaches cell 718, with which the mobile station has not registered, the mobile station registers with cell 718 and automatically with all cells contained in the group 720.

As is illustrated in FIG. 7, once registration has occurred, the new cell grouping ensures that another registration will not be initiated due to large or small signal shadowing. This reduces the impact of the automatic location registration signal strength averaging algorithm used by the mobile station 702. Also, dynamic cell grouping in accordance with the present invention randomizes location registrations throughout the service area. That is, registration is a function of the user's previous movement. This reduces location registration peaks which may occur if the cell groups were fixed. Because the boundaries of the cell groups according to the present invention vary dynamically, location registrations are dispersed throughout the service area rather being concentrated along the fixed cell boundaries.

From the foregoing, it can be seen that the present invention provides a system and method for registering a mobile station in a radiotelephone communication system. To reduce location registration traffic in a system, when a mobile station registers with a registration cell, the mobile station further registers with all cells located within a registration group. The group includes at least all cells contiguous with the registration cell and may additionally include other layers of surrounding cells. The level of registration is dynamically variable to accommodate radio channel traffic in the radiotelephone communication system.

While a particular embodiment of the present invention has been shown and described, modifications may be made and it is therefore intended in the appended claims to cover all such changes and modifications which fall within the true spirit and scope of the invention.

What is claimed is:

1. A method for registering a mobile station in a radiotelephone communication system, the radiotelephone communication system including a plurality of base stations and a network controller coupled to each base station of the plurality of base stations, each base station of the plurality of base stations serving a respective service area, the mobile station having previously registered in a last registered service area, the last registered service area being uniquely identified in the radiotelephone communication system by a last registered base station, the method comprising the steps of:

transmitting system information from a first base station to the mobile station, the first base station serving a first service area, the first service area being surrounded by one or more ranks of service areas, the system information including a cell grouping level and a first base station identifier, the cell grouping level defining a group of one or more service areas including the first service area and indicating a number of the one or more ranks of service areas surrounding the first service area, the first base station identifier uniquely identifying the first service area;

determining at the mobile station whether the group includes the last registered service area, including
relating the first base station identifier and the last registered base station identifier, and
in response thereto, determining whether the last registered service area is within one rank of the one or more ranks of service areas; and
when the group does not include the last registered service area, registering the mobile station.

2. A method for registering a mobile station in a radiotelephone communication system as recited in claim 1 wherein each service area is arranged along one or more axes and wherein each base station identifier uniquely locates each respective service area on each axis of the one or more axes, each base station identifier including one or more fields, each field corresponding to one axis of the one or more axes, and wherein the first base station identifier comprises a base station identifier for the first service area and the last registered base station identifier comprises a base station identifier for the last registered service area, and wherein the relating step includes the step of subtracting each respective field of the last registered base station identifier from each respective field of the first base station identifier.

3. A method for registering a mobile station in a radiotelephone communication system as recited in claim 1 wherein the method further comprises the steps of:
at the mobile station, receiving control signals from two or more base stations;
at the mobile station, determining signal quality of the control signals;
at the mobile station, selecting as the first base station a base station from which the mobile station receives a signal having best signal quality; and
if the first service area does not correspond to the last registered service area, proceeding with the determining step.

4. A method for registering a mobile station in a radiotelephone communication system as recited in claim 1 wherein the registering step comprises the steps of:
at the mobile station, establishing radio communication with the first base station;
transmitting a registration request;
at the first base station, conveying the registration request to the network controller; and
at the network controller, registering the mobile station with the first base station and with all base stations serving service areas in the group of one or more service areas.

5. A method for registering a mobile station in a radiotelephone communication system as recited in claim 4 wherein the method comprises the further step of, at the network controller, routing subsequently received telephone calls to the first base station and to all base stations serving service areas in the group of one or more service areas.

6. A method of registering a mobile station in a radiotelephone system, the radiotelephone system including a plurality of base stations coupled with a network controller and configured for radio communication with the mobile station, the method comprising the steps of:
registering the mobile station with a first base station;
at the mobile station:
storing a first base station identifier;
receiving a first signal from the first base station and a second signal from a second base station;

detecting a received signal characteristic of the first signal and the second signal;

when the received signal characteristic of the first signal is not acceptable and the received signal characteristic of the second signal is acceptable, receiving a control signal from the second base station, the control signal including a second base station identifier and a cell grouping level;

determining, from the cell grouping level, the first base station identifier and the second base station identifier, if the mobile station is registered with the second base station;

if the mobile station is not registered with the second base station, registering with the second base station; and at the network controller:

in response to registration of the mobile station with the second base station, registering the mobile station with a group of base stations, the group of base stations defined by the cell grouping level and the second base station identifier.

7. A method of registering a mobile station in a radiotelephone system as recited in claim 6 wherein the cell grouping level and the first base station identifier define a last registered group of base stations with which the mobile station last registered, and wherein the step of determining comprises the step of determining if the last registered group includes the second base station.

8. A method of registering a mobile station in a radiotelephone system as recited in claim 6 wherein the plurality of base stations is arranged on one or more axes and wherein the first base station identifier and the second base station identifier locate the first base station and the second base station, respectively, on each axis of one or more axes, and wherein the determining step comprises the step of comparing a difference between a location of the first base station and a location of the second base station on each axis with the cell grouping level and concluding that the mobile station is not registered with the second base station when the difference exceeds the cell grouping level.

9. A method of registering a mobile station in a radiotelephone system as recited in claim 8 wherein the first base station identifier and the second base station identifier each includes one or more fields, each field of the one or more fields corresponding to one axis of the one or more axes and uniquely locating the first base station and the second base station, respectively, on each axis of the one or more axes, and wherein the comparing step comprises the step of subtracting each respective field of the first base station identifier from each respective field of the second base station identifier to produce one or more respective results, and comparing each respective result to the cell grouping level, and wherein the concluding step includes the step of concluding that the mobile station is not registered with the second base station if any result of the one or more respective results exceeds the cell grouping level.

10. A method of registering a mobile station in a radiotelephone system as recited in claim 6 wherein the detecting step includes the steps of measuring a first received signal strength of the first signal and measuring a second received signal strength of the second signal, and wherein the method further includes the step of determining a closest base station in response to the first received signal strength and the second received signal strength.

11. A method of registering a mobile station in a radiotelephone system as recited in claim 6 wherein the step of registering the mobile station with the second base station comprises the steps of establishing radio communication with the second base station and transmitting a registration request from the mobile station to the second base station.

12. A method of registering a mobile station in a radiotelephone system as recited in claim 11 wherein the plurality of base stations is arranged on one or more axes and wherein the first base station identifier and the second base station identifier each includes one or more fields, each field of the one or more fields corresponding to one axis of the one or more axes and uniquely locating the first base station and the second base station, respectively, on each axis of the one or more axes, and wherein the method further comprises the steps of:

at the mobile station:

subtracting each respective field of the first base station identifier from each respective field of the second base station identifier to produce one or more respective results;

comparing each respective result to the cell grouping level;

concluding that the mobile station is not registered with the second base station if any result of the one or more respective results exceeds the cell grouping level;

at the second base station:

receiving the registration request; and registering the mobile station with the second base station.

* * * * *